US012646392B2

(12) United States Patent
Gharib et al.

(10) Patent No.: US 12,646,392 B2
(45) Date of Patent: Jun. 2, 2026

(54) ORIENTATION AUTODETECTION BASED ON MOTION SENSORS

(71) Applicant: Schneider Electric Buildings Americas, Inc., Carrollton, TX (US)

(72) Inventors: Isam Gharib, Montreal (CA); Jean-Pierre Collin, Montreal (CA)

(73) Assignee: Schneider Electric Buildings Americas, Inc., Carrollton, TX (US)

( * ) Notice: Subject to any disclaimer, the term of this patent is extended or adjusted under 35 U.S.C. 154(b) by 0 days.

(21) Appl. No.: 18/760,372

(22) Filed: Jul. 1, 2024

(65) Prior Publication Data

US 2025/0006025 A1      Jan. 2, 2025

Related U.S. Application Data

(60) Provisional application No. 63/524,026, filed on Jun. 29, 2023.

(51) Int. Cl.
G08B 13/19          (2006.01)
G06F 3/0488          (2022.01)

(52) U.S. Cl.
CPC ........... G08B 13/19 (2013.01); G06F 3/0488 (2013.01); *G06F 2200/1614* (2013.01); *G06F 2200/1637* (2013.01)

(58) Field of Classification Search
CPC ..... G06F 2200/1614; G06F 2200/1637; G06F 3/0346; G06F 1/1626; G09G 2340/0492; G06V 10/242
See application file for complete search history.

(56) References Cited

U.S. PATENT DOCUMENTS

| | | | | |
|---|---|---|---|---|
| 10,877,573 B2 * | 12/2020 | Jeng | ...................... | G06F 3/0346 |
| 2007/0032886 A1 * | 2/2007 | Tsai | ...................... | G06F 1/1684 |
| | | | | 700/83 |
| 2010/0204953 A1 * | 8/2010 | Onishi | ................... | G06F 3/017 |
| | | | | 702/150 |
| 2013/0120458 A1 * | 5/2013 | Celebisoy | .............. | G06F 3/147 |
| | | | | 345/619 |

(Continued)

OTHER PUBLICATIONS

Search Report and Written Opinion for Int'l Application No. PCT/US2024/036335 dated Oct. 2, 2024, 11 pages.

*Primary Examiner* — Koosha Sharifi-Tafreshi
(74) *Attorney, Agent, or Firm* — FIG. 1 Patents

(57) ABSTRACT

Systems and methods for detecting device orientation use two motion sensors arranged perpendicularly to one another require, one horizontal (landscape) and one vertical (portrait), to automatically detect orientation of an electronic device. The motion sensors operate mainly to detect and notify the device of any motion in proximity to the device, but the perpendicular positioning additionally allows the sensors to be used for autodetection of device orientation. The sensors detect movement near the electronic device such that one of the sensors will detect the movement more strongly than the other sensor, depending on whether the device is oriented horizontally or vertically. The stronger detection by one of the sensors can then be used to provide an indication of the device orientation. Such an arrangement avoids the need for gyroscopes, accelerometers, or other components designed to detect position and orientation.

20 Claims, 11 Drawing Sheets

(56)                 References Cited

U.S. PATENT DOCUMENTS

2013/0263034 A1 * 10/2013 Bruck ................. G06F 3/04842
                                                          715/771
2017/0060150 A1     3/2017 Stefanski et al.
2020/0387930 A1 * 12/2020 Canceri ................. G06F 1/1607

* cited by examiner

100

Room 1

102

BMS/External
Control System

105

104

104

Room 2

105

104

106

104

106

104

114

116

112a

Optical Sensing
Area

Landscape
Sensor

112b

Portrait
Sensor

Optical Sensing
Area (Perpendicular Implementation of Sensors)

ORIENTATION AUTODETECTION BASED ON MOTION SENSORS

CROSS-REFERENCE TO RELATED APPLICATIONS

This application for patent claims the benefit of priority to and incorporates herein by reference U.S. Provisional Application No. 63/524,026, entitled "Orientation Autodetection Based on Motion Sensors," filed Jun. 29, 2023.

TECHNICAL FIELD

The present disclosure relates to detection of device orientation in electronic devices, and particularly to systems and methods for autodetection of device orientation based on motion sensors in such electronic devices.

BACKGROUND

Modern electronic devices have display screens that can be used in both horizontal (landscape) and vertical (portrait) orientation. These electronic devices come equipped with functionality that detects the orientation of the device and automatically rotates the display screen to the appropriate orientation. The orientation detection functionality is typically implemented using a gyroscope that relies on gravity and angular momentum preservation to detect rotation. An accelerometer can also be used to detect orientation by measuring a device's acceleration with respect to the Earth. However, gyroscopes, accelerometers, and similar components designed to detect position and orientation can add significant cost to an electronic device, increase its component count, as well as take up extra space within the device that could be used for other purposes.

Accordingly, a need exists for a way to detect device orientation without requiring gyroscopes, accelerometers, or other components designed to detect position and orientation.

SUMMARY

Embodiments of the present disclosure provide systems and methods for detecting device orientation without requiring gyroscopes, accelerometers, or other components designed to detect position and orientation. The systems and methods disclosed herein employ two motion sensors arranged perpendicularly to one another, one horizontal (landscape) and one vertical (portrait), to automatically detect the orientation of an electronic device. The motion sensors operate mainly to detect and notify the device of any motion in proximity to the device, but their perpendicular positioning additionally allows the sensors to be used for autodetection of device orientation. More particularly, movement near the electronic device tends to be horizontal as people move mostly from side to side and back and forth, such that one of the sensors will detect the horizontal movement more strongly than the other sensor, depending on whether the device is oriented horizontally or vertically. The stronger detection by one of the sensors can then be used to provide an indication of the device orientation.

In some embodiments, the motion sensors herein are a type of sensor that are predisposed in a particular detection direction, such that the sensors generate a stronger output signal when motion is detected along their detection direction and a weaker signal otherwise. Examples of suitable sensors include various types of passive infrared (PIR)

sensors, such as pyroelectric PIR sensors, although other types of sensors that have a predefined detection direction may also be used. The systems and methods herein arrange two such sensors perpendicularly to one another in an electronic device, then compare their output signals in the presence of motion. Whichever sensor outputs a stronger signal, the orientation of that sensor, whether horizontal (landscape) or vertical (portrait), is adopted as the orientation of the device. In some embodiments, the comparison is performed based on a smoothed or cleaned up version of the output signals, such as an RMS value, an average of the signal amplitudes, and the like, to facilitate ease of comparison.

The systems and methods herein thus provide a number of advantages. For one thing, there is no requirement to install a gyroscope, accelerometer, or similar component in an electronic device to autodetect device orientation. This can significantly reduce manufacturing cost for the device while reducing its component count and freeing up extra space within the device for other purposes. Any type of electronic device that has or may be equipped with motion sensing functionality can benefit from the systems and methods herein, including room environment controllers, entryway controllers, smart doorbells, industrial equipment controllers, human machine interfaces (HMI), and the like.

In general, in one aspect, embodiments of the present disclosure relate to an electronic device. The electronic device comprises, among other things, a processor and a display communicatively coupled to the processor. The electronic device also comprises a first sensor communicatively coupled to the processor and configured to provide first sensing data representing a first sensor output signal. The electronic device further comprises a second sensor communicatively coupled to the processor and provided or otherwise arranged in a perpendicular configuration relative to the first sensor, the second sensor configured to provide second sensing data representing a second sensor output signal. The processor is configured to determine an orientation of the electronic device based at least in part upon analyzing the first sensing data and the second sensing data, and further configured to control orientation of the display based upon the orientation of the electronic device.

In general, in another aspect, embodiments of the present disclosure relate to a method of detecting device orientation in an electronic device. The method comprises, among other things, obtaining first sensing data from a first sensor provided in the electronic device, the first sensing data representing a first sensor output signal. The method also comprises obtaining second sensing data from a second sensor provided or otherwise arranged in the electronic device in a perpendicular configuration relative to the first sensor, the second sensing data representing a second sensor output signal. The method further comprises determining an orientation of the electronic device based at least in part upon analyzing the first sensing data and the second sensing data, and controlling orientation of a display of the electronic device based upon the orientation of the electronic device.

In general, in yet another aspect, embodiments of the present disclosure relate to a non-transitory computer-readable media storing computer-readable instructions for detecting device orientation in an electronic device. The computer-readable instructions, when executed by one or more processors, causes the electronic device to obtain first sensing data from a first sensor provided in the electronic device, the first sensing data representing a first sensor output signal. The computer-readable instructions also causes the electronic device to obtain second sensing data from a second sensor provided or otherwise arranged in the electronic device in a perpendicular configuration relative to the first sensor, the second sensing data representing a second sensor output signal. The computer-readable instructions further causes the electronic device to determine an orientation of the electronic device based at least in part upon analyzing the first sensing data and the second sensing data, and control orientation of a display of the electronic device based upon the orientation of the electronic device.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Further, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
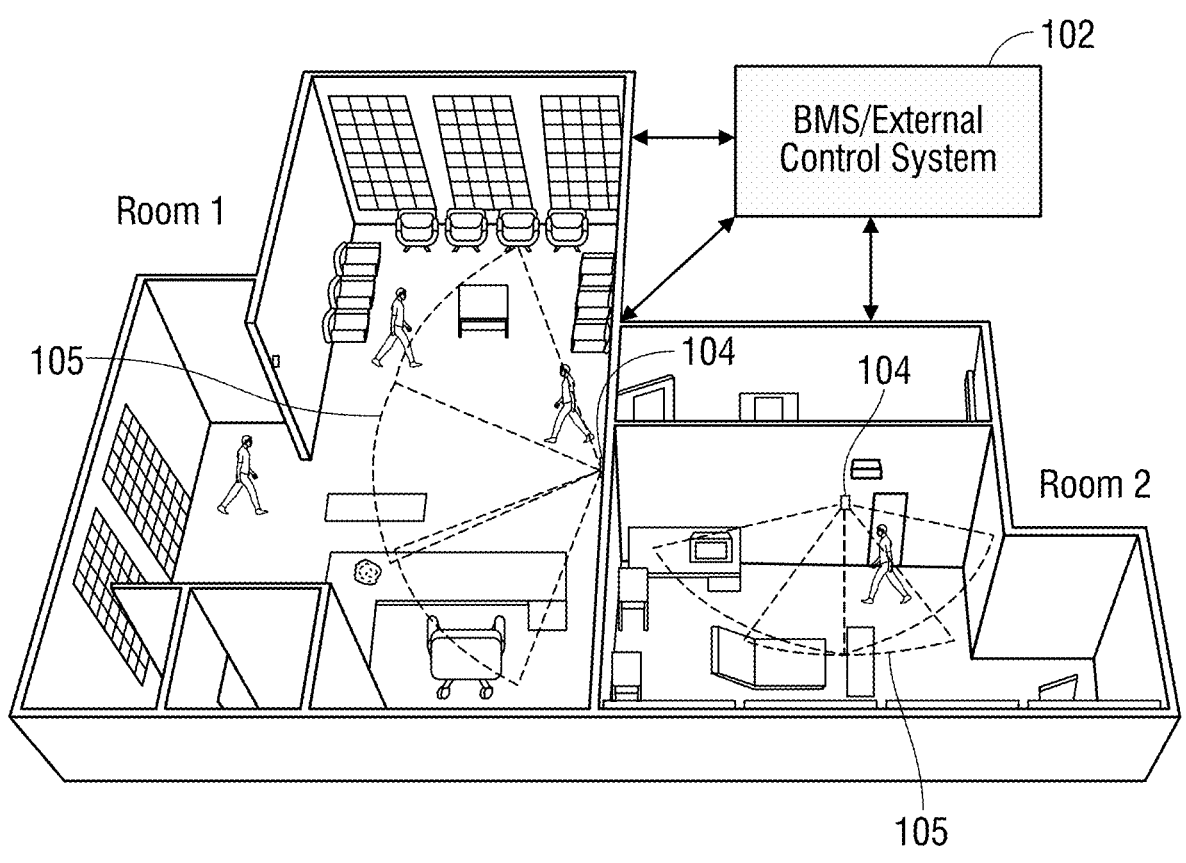
FIG. 1 illustrates a partial cutaway view of a residential or office building in which embodiments of the present disclosure may be used.

Referring now to FIG. 1, a partial cutaway view is shown for a floor of a residential or office building 100 in which embodiments of the present disclosure may be used. The building 100 in this example employs a building management system (BMS) 102 to maintain the internal environment of the building based on one or more user settings.

Based on these user settings, the building management system 102 monitors and controls various mechanical and electrical equipment in the building 100, including heating, cooling, ventilation, lighting, power, security, and the like, as needed. In some embodiments, an external control system, such as a network or cloud-based system, may also be used to maintain the internal environment of the building 100.

In this example, there are two main rooms on the floor of the building 100. Room 1 is a reception area that has at least a first room environment controller 104 installed on one wall, while Room 2 is an interior room that has at least a second room environment controller 104 installed on another wall. The room controllers 104 are connected to the building management system 102 and allow a user to view and set environmental conditions in the rooms via the building management system 102. For example, the user may use the room controllers 104 to set the temperature, humidity, lighting, and other environmental conditions in the rooms under various circumstances (e.g., occupied, time of day, etc.). Each room controller 104 also has motion sensing capability, as indicated by sweep patterns 105, that can detect whether each room is occupied and adjust the environmental conditions in the room accordingly, as set by the user.

Figure 2A:
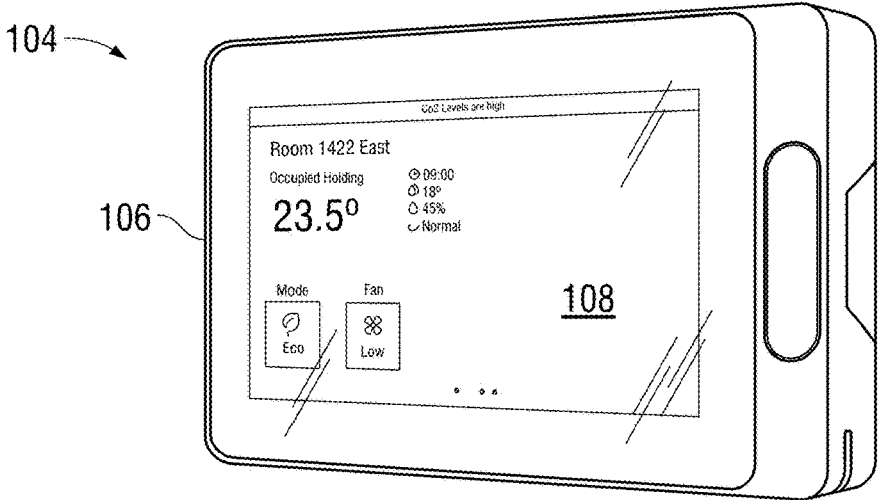
FIGS. 2A and 2B illustrate close-up views of a room controller in accordance with embodiments of the present disclosure.
Figure 2B:
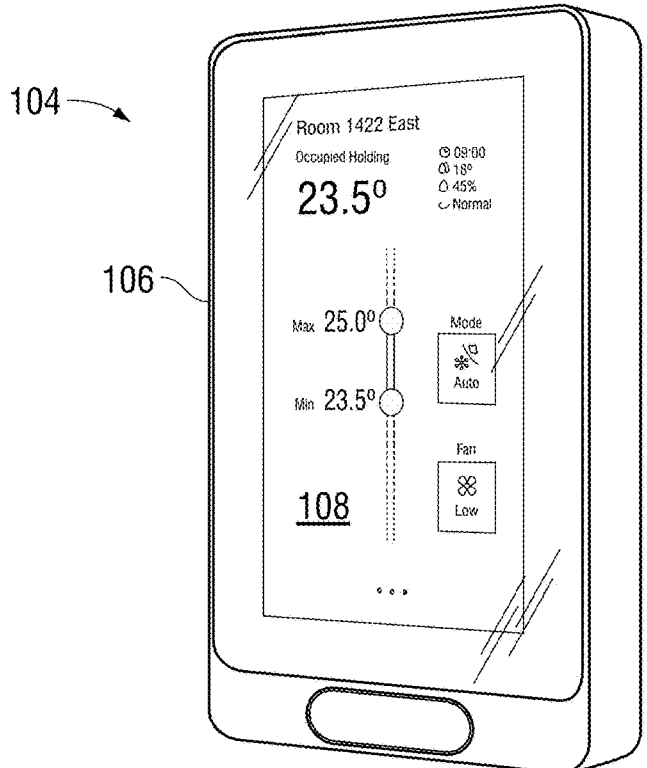

FIGS. 2A and 2B show close-up views of one of the room controllers 104 from FIG. 1. Each room controller 104 has a generally rectangular enclosure or housing 106 with a generally rectangular display screen 108 set therein that automatically adjusts (rotates) visual content being displayed on the screen 108 based on the orientation of the room controller 104. The display screen 108 in this example is a touchscreen display, as indicated by the lack of tactile buttons, although non-touchscreen displays may of course be used. As can be seen, the room controller 104 is mounted in a horizontal or landscape orientation in FIG. 2A, whereas it is mounted in a vertical or portrait orientation in FIG. 2B. In each instance, the room controller 104 has automatically detected its respective orientation and adjusted the visual content displayed on its display screen 108 for either landscape or portrait orientation accordingly.

Figure 3:
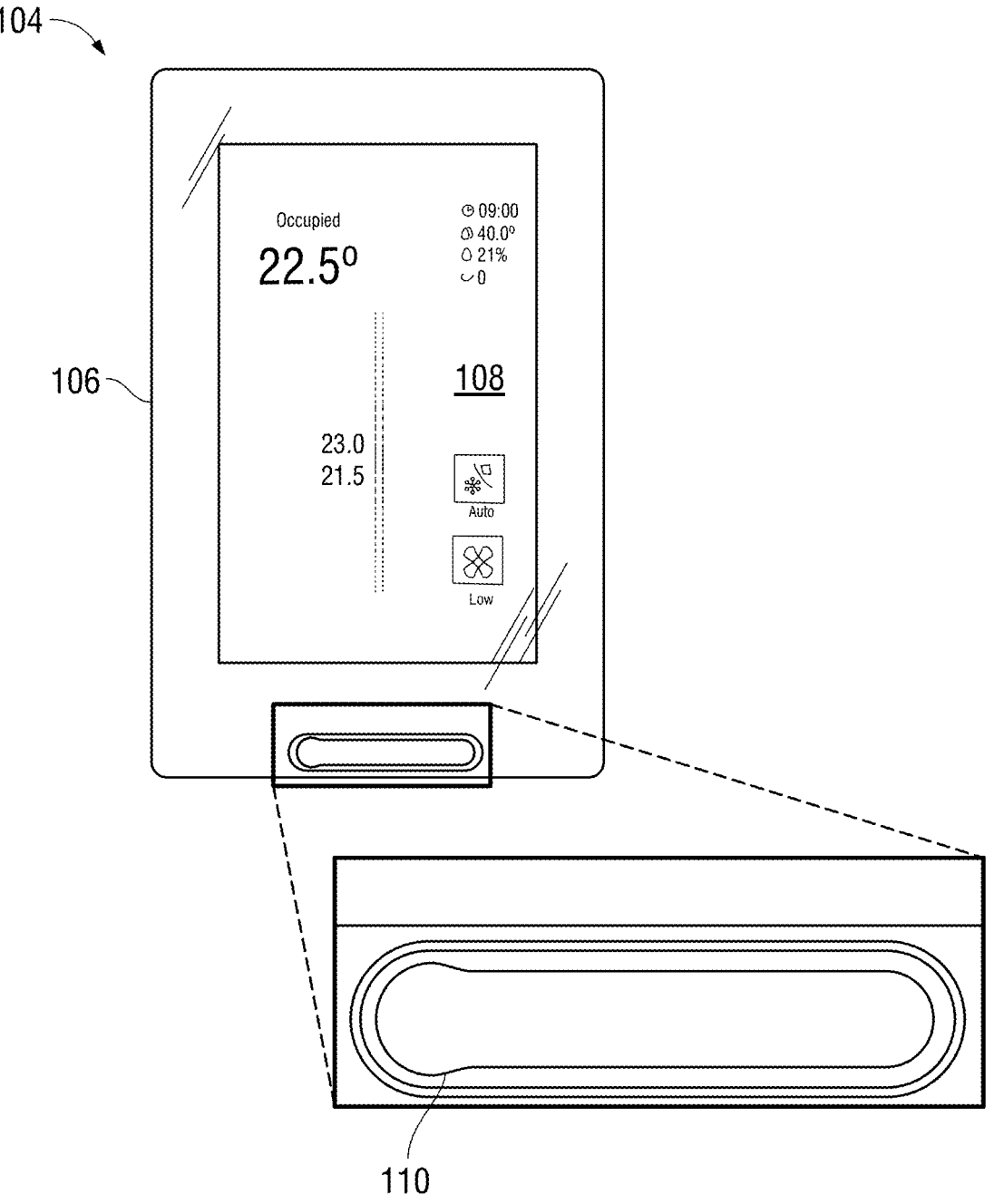
FIG. 3 illustrates a close-up view of a Fresnel lens for a room controller in accordance with embodiments of the present disclosure.

Referring next to FIG. 3, in some embodiments, the orientation autodetection may be performed by the room controller 104 using a pair of motion sensors, as previously mentioned. In some embodiments, the motion sensors are mounted internally within the room controller 104 behind a Fresnel lens set within the housing 106 of the controller 104. An example of a Fresnel lens that may be used with the motion sensors is indicated at 110 in the figure. The Fresnel lens 110 in this example is a generally elongate lens that extends horizontally along a bottom edge of the room controller 104. This Fresnel lens 110 has dimensions (i.e., length and width) that are large enough to cover both motion sensors, although it is possible to use a separate Fresnel lens 110 for each motion sensor in some embodiments. It is also possible to locate the Fresnel lens 110 in a different location on the room controller 104, for example, along a top edge thereof, depending on the location of the motion sensors. In either case, the Fresnel lens 110 functions to gather light, including infrared light, and focus the light onto the motion sensors.

Figure 4:
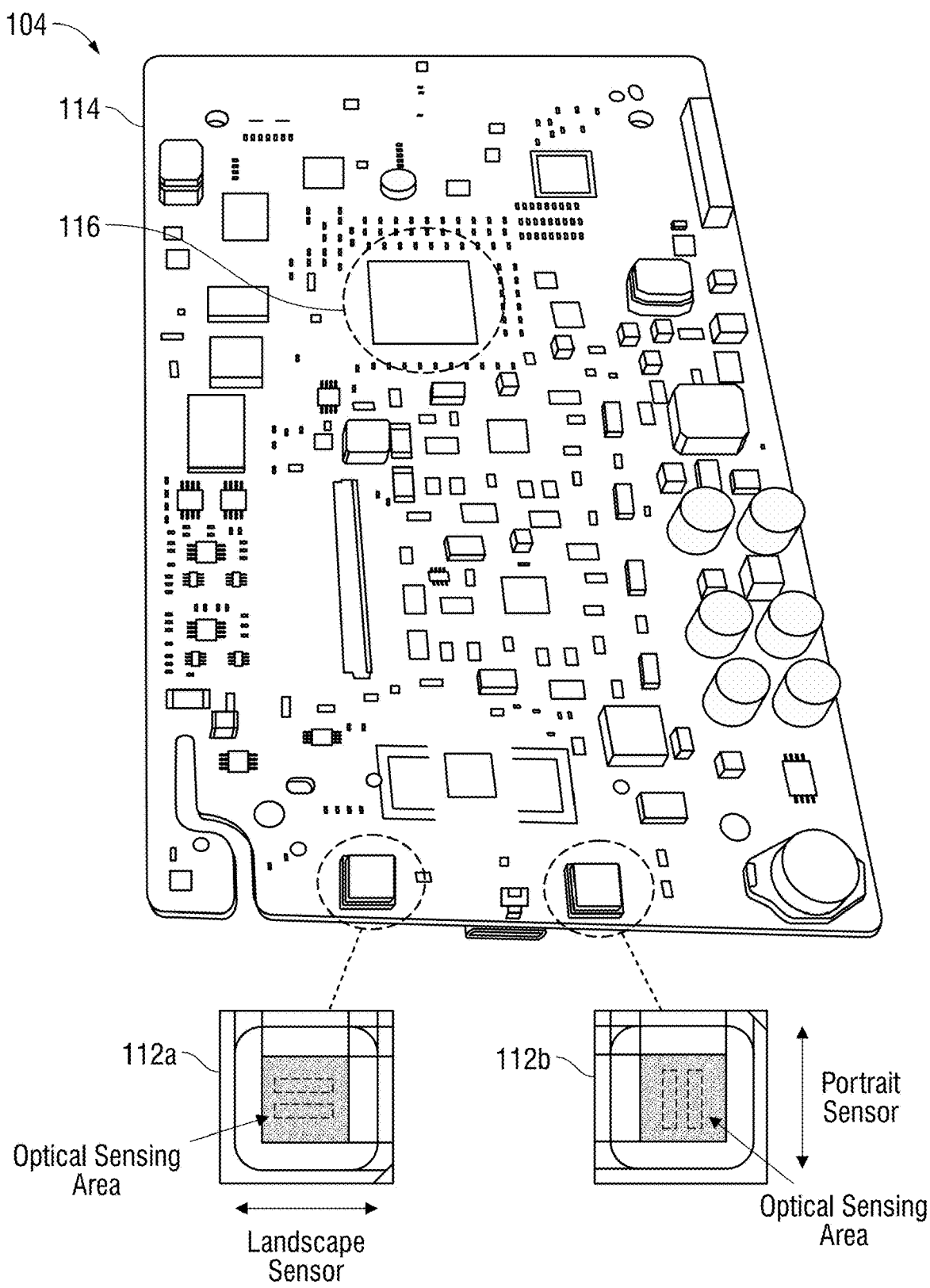
FIG. 4 illustrates exemplary motion sensors that may be used with a room controller in accordance with embodiments of the present disclosure.

FIG. 4 illustrates exemplary motion sensors, indicated at 112a and 112b, that may be used with the room controller 104 in accordance with embodiments of the present disclosure. As this view shows, the motion sensors 112a and 112b are mounted on a printed circuit board (PCB) 114 of the room controller 104. The location of the motion sensors 112a and 112b on the PCB 114 correspond directly to the location of the Fresnel lens 110 on the room controller 104. A microcontroller unit (MCU) 116 is also mounted on the PCB 114 along with other electrical and mechanical components. The particular type of MCU 116 and other components on the PCB 114 may vary depending on the type and function of the room controller 104.

The motion sensors 112a and 112b in the present example are a type of sensor that are predisposed in a particular detection direction, as indicated by the double-headed arrows. This means that the sensors 112a and 112b output a stronger signal when movement is detected along their detection direction and a weaker signal otherwise. Examples of sensors that may be suitable for use as the motion sensors 112a and 112b include various types of passive infrared (PIR) sensors, such as part number IRA-S200ST01A01, a type of pyroelectric PIR sensor available from Murata Manufacturing Co., Ltd. Other types of sensors that have a predefined detection direction may also be used within the scope of the present disclosure.

In the present example, the motion sensors 112a and 112b are nearly identical to one another except that one sensor is arranged perpendicularly to the other sensor on the PCB 114, with the first motion sensor 112a oriented as a landscape (i.e., horizontal) sensor based on its detection direction, and the second motion sensor 112b oriented as a portrait (i.e., vertical) sensor based on its detection direction. Then, when the sensors 112a and 112b detect movement, one of the sensors will generate a stronger output signal than the other sensor based on the orientation of the room controller 104 (i.e., portrait versus landscape). This is because the movement tends to be horizontal as people mostly move from side to side and back and forth. Whichever sensor 112a or 112b provides a stronger output signal, the orientation of that sensor 112a or 112b, whether landscape (horizontal) or portrait (vertical), is declared as the orientation of the room controller 104.

Although the discussion thus far has centered on a room controller, those having ordinary skill in the art will appreciate that the principles and teachings herein are equally applicable to other types of electronic devices. In general, any electronic device that has or may be equipped with motion sensing functionality can benefit from the principles and teachings herein, including entryway controllers, smart doorbells, industrial equipment controllers, human machine interfaces (HMI), and numerous other electronic devices.

Figure 5:
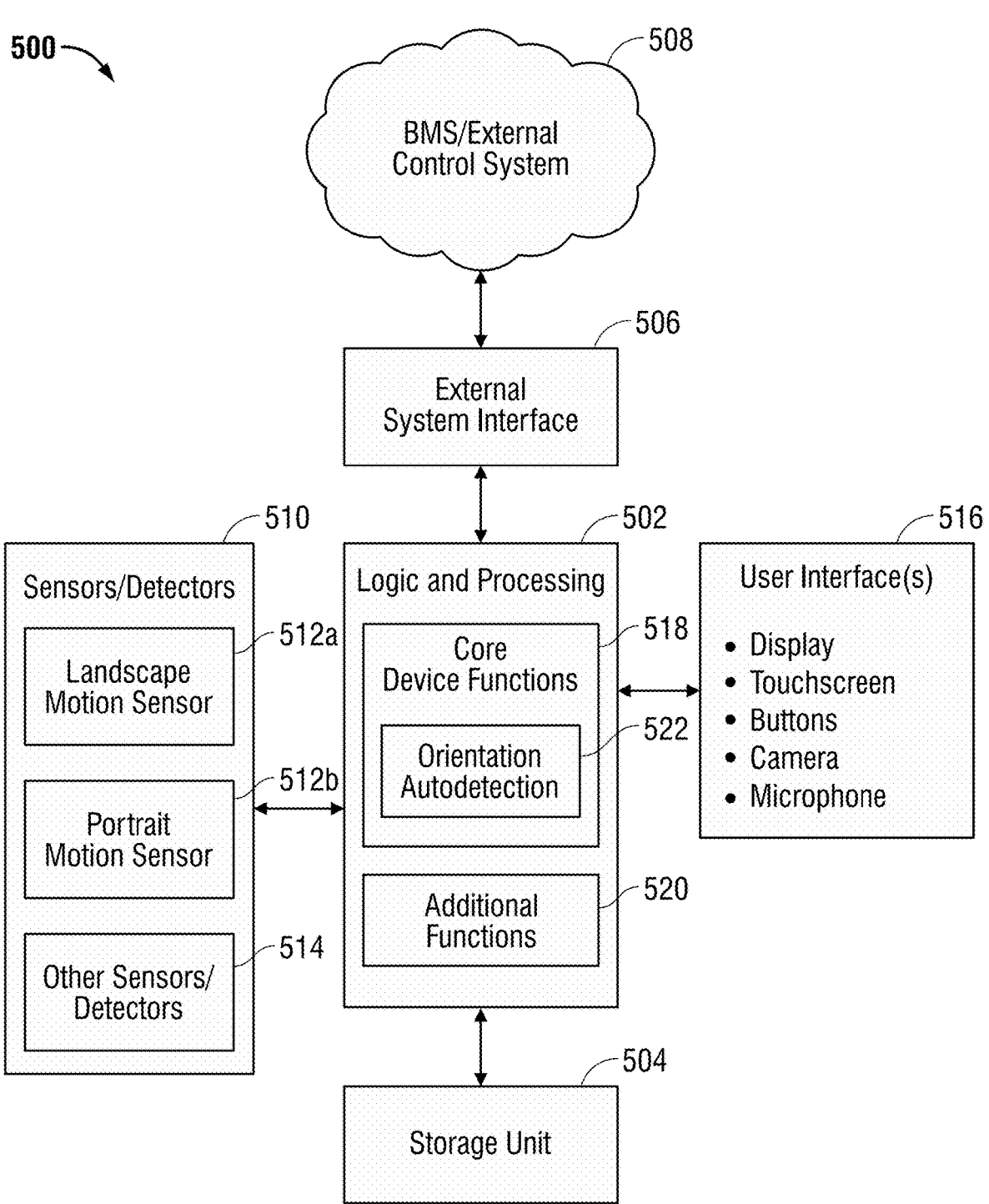
FIG. 5 illustrates a system architecture for an exemplary electronic device with orientation autodetection in accordance with embodiments of the present disclosure.

FIG. 5 illustrates a system architecture for an exemplary electronic device 500 that may be used, for example, as a room environment controller similar to that described above or other types of devices that employ motion sensors. The electronic device 500 is depicted here in block diagram form using a number of discrete blocks for easy reference. However, those skilled in the art will understand that any block may be divided into two or more constituent blocks, and any two or more blocks may be combined into a single block, without departing from the scope of the disclosed embodiments.

In FIG. 5, the electronic device 500 has a centralized logic and processing unit 502 that is responsible for overall operation of the electronic device 500. The logic and processing unit 502 provides processing for sensor inputs (e.g., sampling, filtering, analog-to-digital conversion, etc.), issues command to the sensors and other devices as needed, manages communication to and from the electronic device 500, and the like. Suitable components that may be used as the logic and processing unit 502 include, for example, a microprocessor, microcontroller, programmable logic controller (PLC), field programmable gate array (FPGA), application specific integrated circuit (ASIC), and other processors. Several such processors working in conjunction with one another may operate as the logic and processing unit 502.

A storage unit 504 may be connected to the logic and processing unit 502 for storing any programming used by the logic and processing unit 502. For example, the storage unit 504 may store boot loader programs, firmware, and any data needed by the logic and processing unit 502, all of which may be updated from time to time as needed via manual or automatic download. Any suitable storage unit known to those skilled in the art may be used as the storage unit 504, including volatile memory (e.g., RAM), nonvolatile memory (e.g., Flash), magnetic memory, optical memory, and the like.

An external system interface 506 may also be connected to the logic and processing unit 502. The external system interface 506 connects the electronic device 500 to an external control system 508, for example, a building management system (BMS) or similar control system. This external system interface 506 allows the electronic device 500 to receive and communicate commands and data with the external control system 508 when the electronic device 500 is connected to such control system 508.

Also connected to the logic and processing unit 502 are various sensors and detectors 510 that facilitate operation of the electronic device 500. In accordance with embodiments of the present disclosure, the sensors and detectors 510 include two motion sensors 512a and 512b that may be used to autodetect orientation for the electronic device 500 in a manner similar to that described above. As described above, the motion sensors 512a and 512b may be a type of sensor that is predisposed in a particular detection direction, such that the sensors output a stronger signal when motion is detected along their detection direction and a weaker signal otherwise. These motion sensors 512a and 512b may then be arranged perpendicularly to one another, with one motion sensor 512a oriented as a landscape (i.e., horizontal) sensor based on its detection direction, and the other motion sensor 512b oriented as a portrait (i.e., vertical) sensor, to autodetect orientation for the electronic device 500.

Other types of sensors and detectors 510 that may be connected to the logic and processing unit 502 include temperature sensors, humidity sensors, $CO_2$ sensors, occupancy sensors, light sensors, heat sensors, and the like, indicated generally at 514. One or more user interfaces 516 may also be connected to the logic and processing unit 502 for displaying information to users and receiving user selections and settings. Examples of user interfaces 516 that may be connected to the logic and processing unit 502 include a simple display, a touchscreen display, various tactile buttons, a camera, a microphone, and the like.

In general operation, the logic and processing unit 502 of the electronic device 500 is configured or programmed to perform various core device functions 518. The particular core device functions 518 performed depend on the type of electronic device 500 and may include, for example, functions related to room temperature, humidity, occupancy, security, fire safety, and the like. In addition to the core device functions 518, additional device functions 520 may be downloaded or otherwise added to the electronic device 500 from time to time as needed. Examples of additional device functions 520 that may be performed by the logic and processing unit 502 include functions related to lighting control, video/music control, mini blind control, and the like.

In accordance with embodiments of the present disclosure, the logic and processing unit 502 is configured or programmed to perform an orientation autodetection routine 522 as one of the core device functions 518. The logic and processing unit 502 is configured or programmed to perform this orientation autodetection routine 522 using the motion sensors 512a and 512b described above. As described above, these motion sensors 512a and 512b are arranged perpendicularly to one another, with one sensor 512a oriented as a landscape sensor and the other sensor 512b oriented as a portrait sensor, to facilitate autodetection of device orientation for the electronic device 500. This orientation autodetection routine 522 may be performed on a real-time basis each time motion is detected by either of the motion sensors, or upon occurrence of a certain event, such as powering on the electronic device 500, or both.

Figure 6:
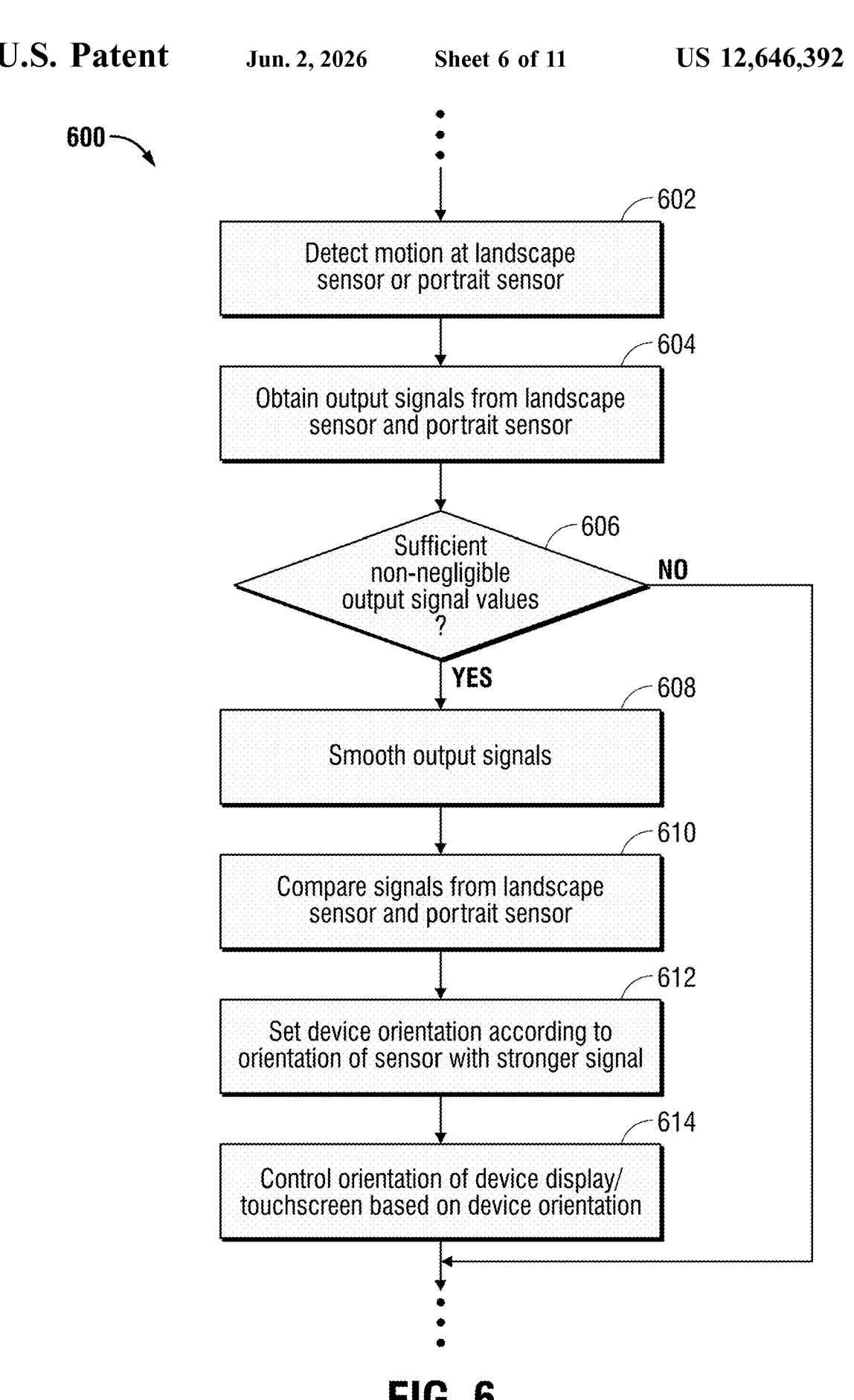
FIG. 6 illustrates a flowchart representing method for orientation autodetection in accordance with embodiments of the present disclosure.

FIG. 6 illustrates a flowchart representing an orientation autodetection method 600 that may be used by or with the logic and processing unit 502 of the electronic device 500 to perform the orientation autodetection routine 522. The method 600 generally begins at block 602 with entry into the orientation autodetection routine upon detection of motion by either the landscape sensor or the portrait sensor. Such motion, as mentioned earlier, tends to be horizontal motion, as people move mostly from side to side or back and forth. At block 604, the output signals generated by the sensors in response to detecting motion are obtained in the form of signal measurements, usually voltage values, for further processing. Different types of sensors generate output signal measurements at different rates, but in general, a rate of six output signal measurements per second is considered adequate for the purposes herein.

At block 606, a determination is made whether a sufficient number of non-zero or non-negligible output signal measurements have been obtained within a predefined measurement interval, for example, about five seconds. A longer or shorter measurement interval may also be used. In some embodiments, the minimum number of non-zero or non-negligible output signal measurements that need to be obtained within the predefined measurement interval is three. In general, however, any minimum number sufficient to ensure accurate device orientation detection may be used. If the determination at block 606 is No, then the method 600 simply exits the routine, as there is an insufficient number of non-zero or non-negligible measurements to ensure accurate device orientation detection.

If the determination at block 606 is Yes, then the method 600 proceeds to smooth the measurements that were obtained during the measurement interval at block 608. Smoothing has the benefit of cleaning up the output signal measurements and allowing them to be more easily and clearly compared. In some embodiments, smoothing may involve obtaining an RMS value for the output signal measurements using the well-known equation, $$RMS = \sqrt{\frac{1}{n}\sum_{i=1}^{n} x_i^2} \, ,$$

where x represents the output signal measurements and n represents the number of measurements. In some embodiments, it is also possible to perform the comparison using an average of the amplitudes of the output signal measurements, as well as other numerical techniques known to those skilled in the art.

At block 610, a comparison is made of the output signal measurements from the landscape sensor and the portrait sensor to determine which sensor generated a stronger output signal over the measurement interval. At block 612, the orientation of the sensor that generated a stronger output signal, whether landscape or portrait, is declared or set as the orientation for the device. At block 614, the orientation of the display or touchscreen of the device is controlled or otherwise adjusted (i.e., rotated) accordingly based on the orientation established for the device. The orientation, including data used to determine the orientation, may also be stored locally in a storage unit of the electronic device 500 and/or uploaded to a BMS or external control system 508, for example, for tracking and analysis of the data over time.

Figure 7:
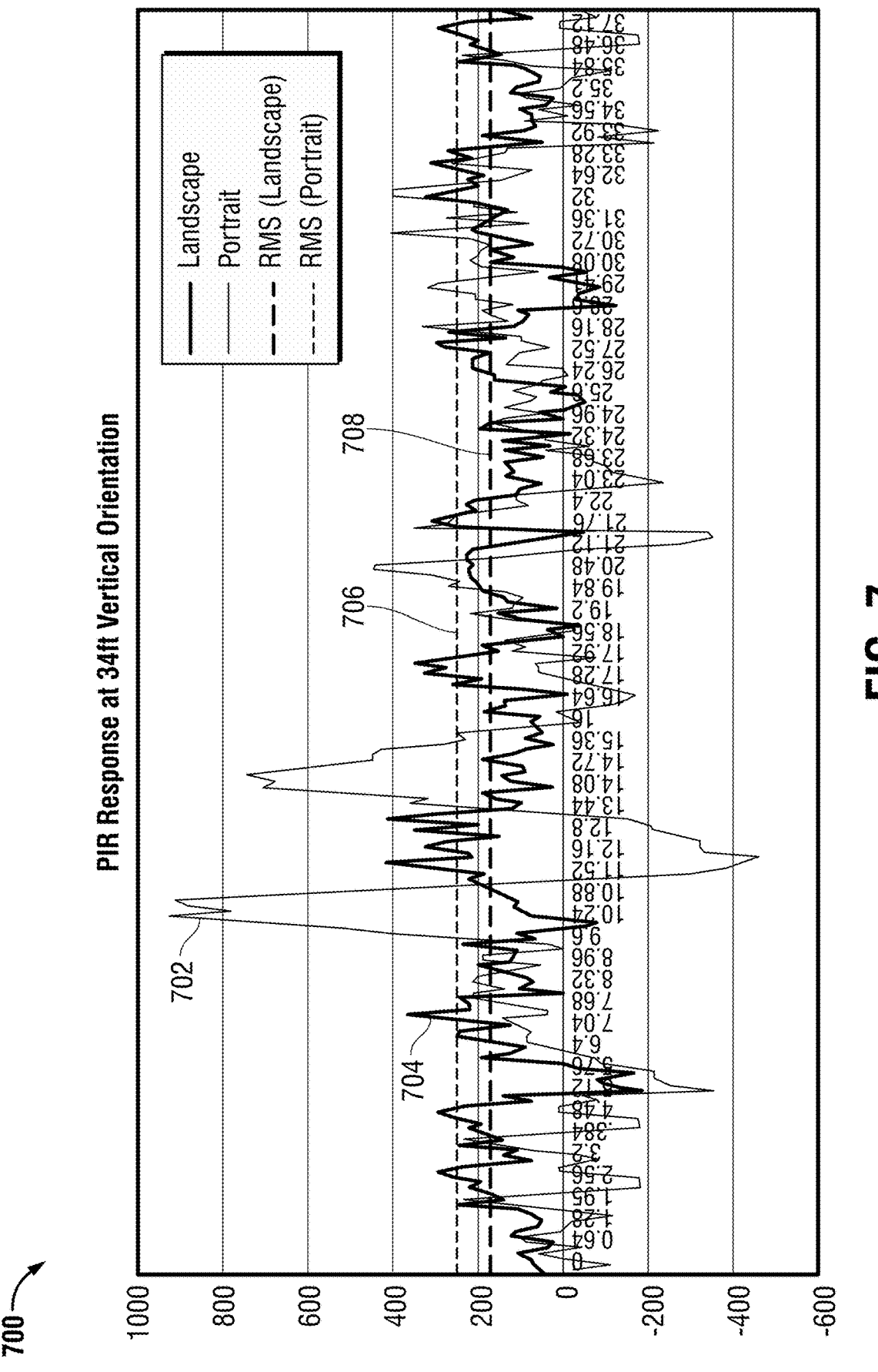
FIG. 7 is a graph of sensor output signals that confirm an efficacy of the orientation autodetection herein in accordance with embodiments of the present disclosure.
Figure 8A:
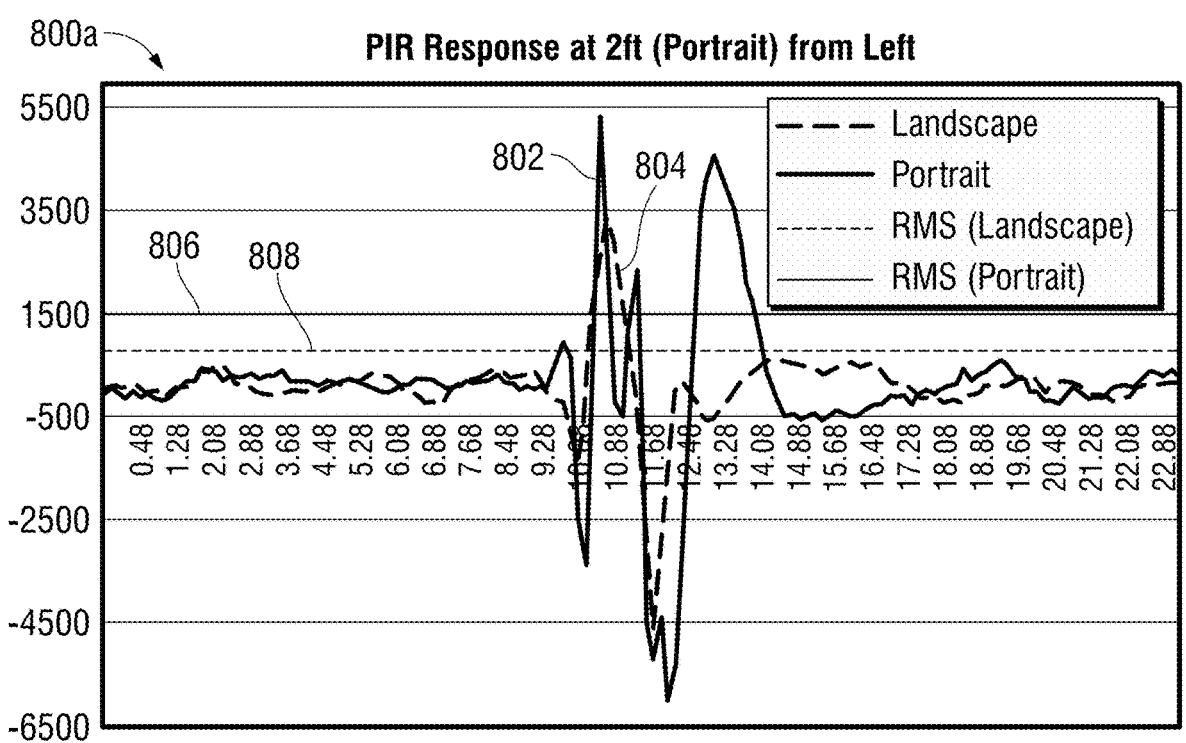
FIGS. 8A-8D show a set of graphs of sensor output signals that again confirm the orientation autodetection herein in accordance with embodiments of the present disclosure.
Figure 8B:
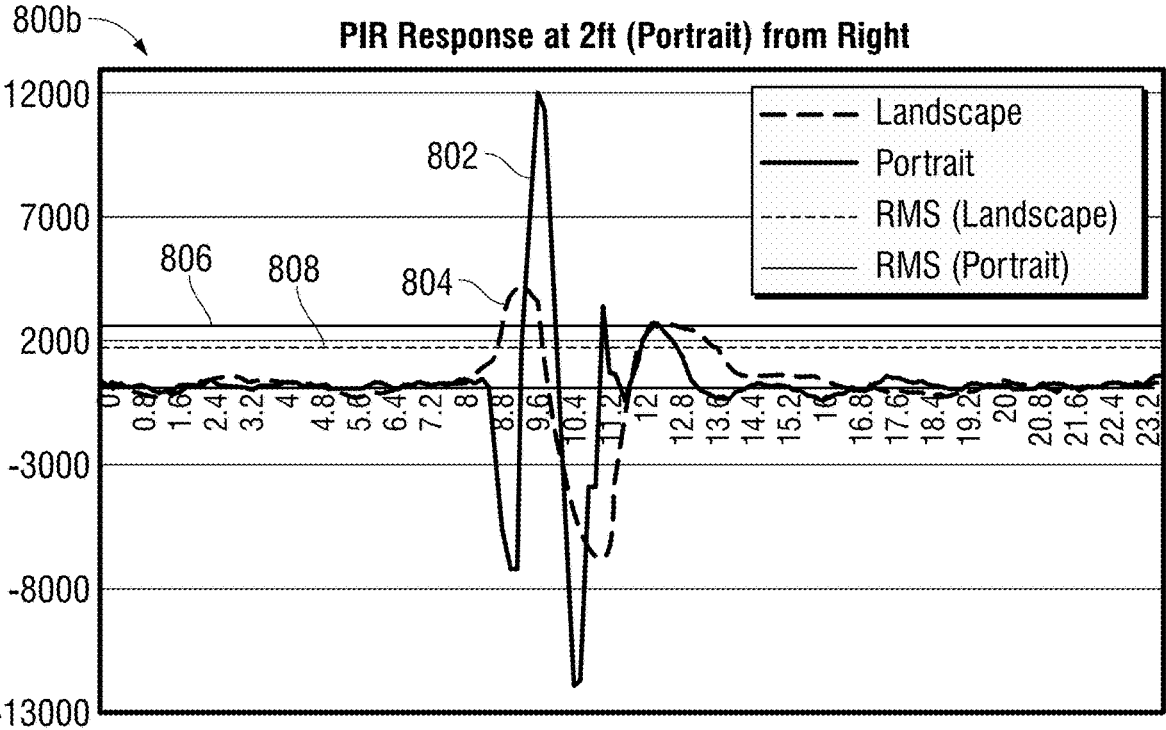
Figure 8C:
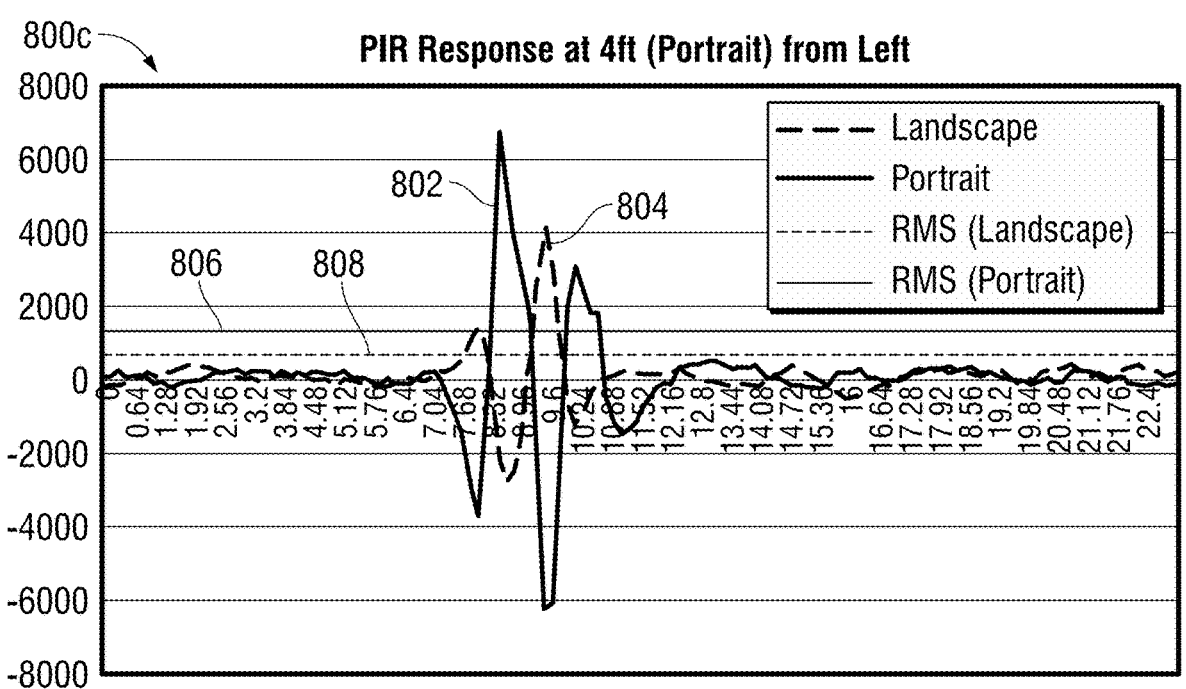
Figure 8D:
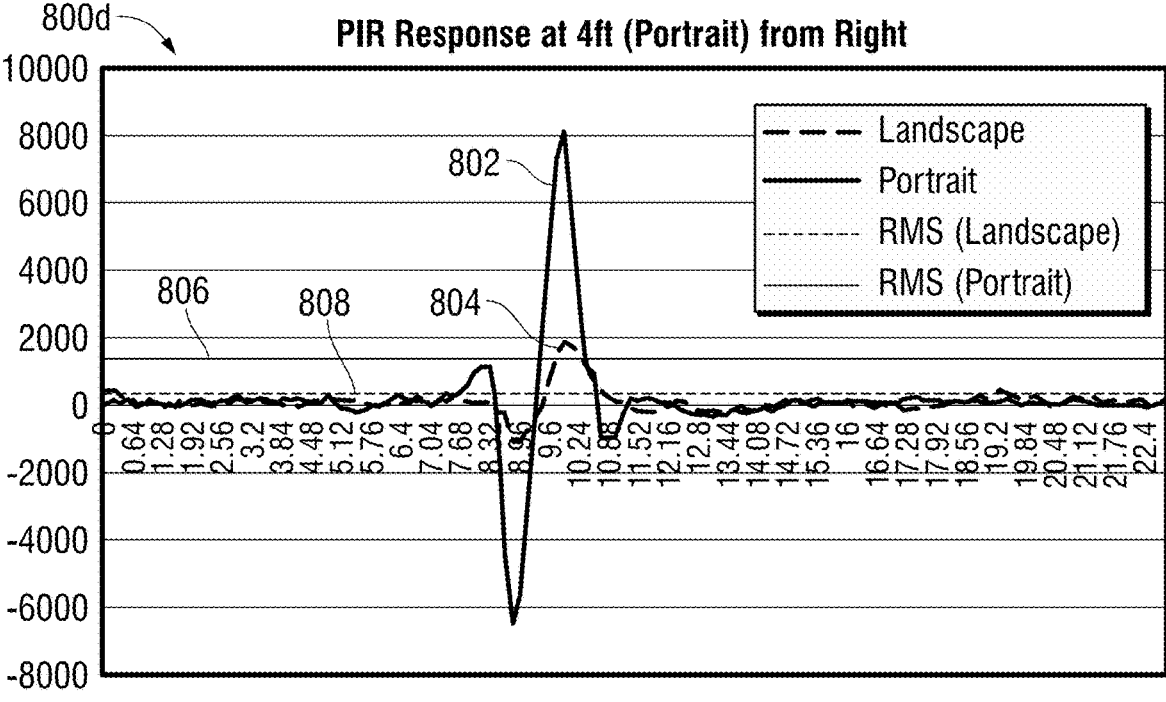
Figure 9A:
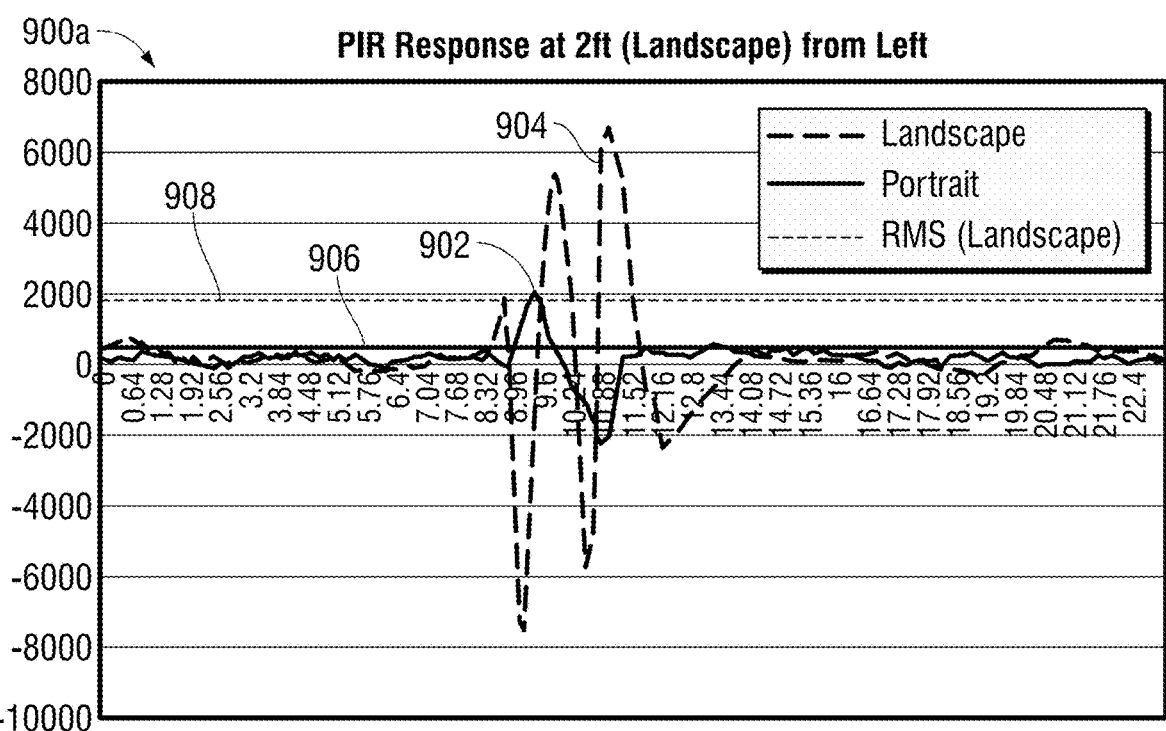
FIGS. 9A-9D show another set of graphs that again confirm the orientation autodetection herein in accordance with embodiments of the present disclosure.
Figure 9B:
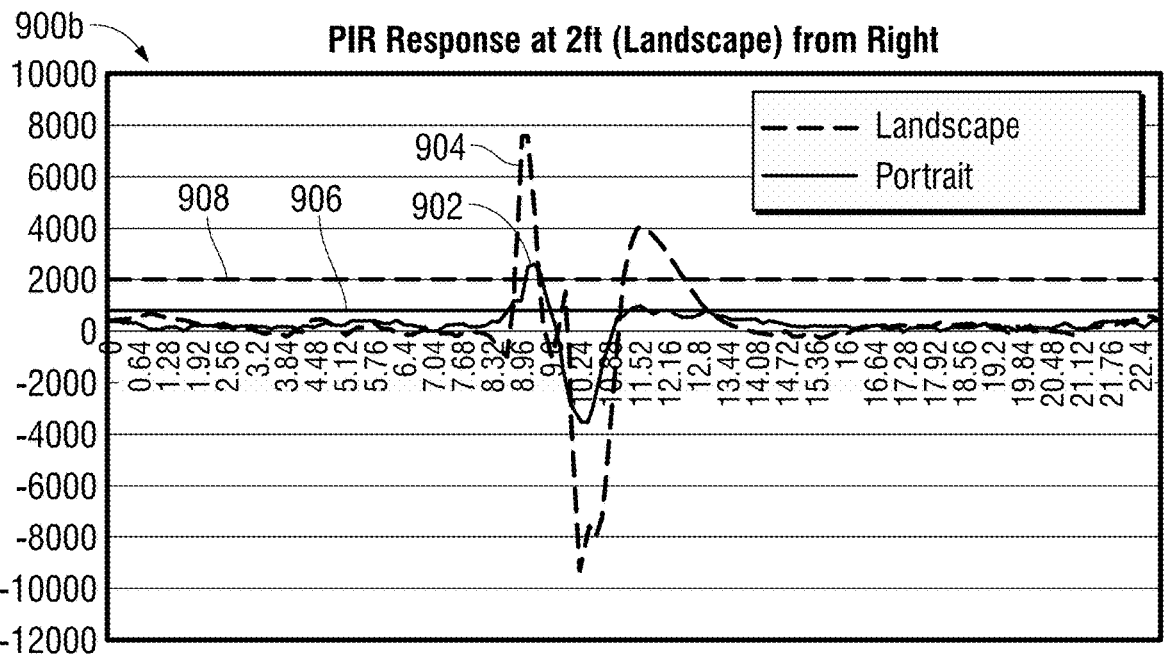
Figure 9C:
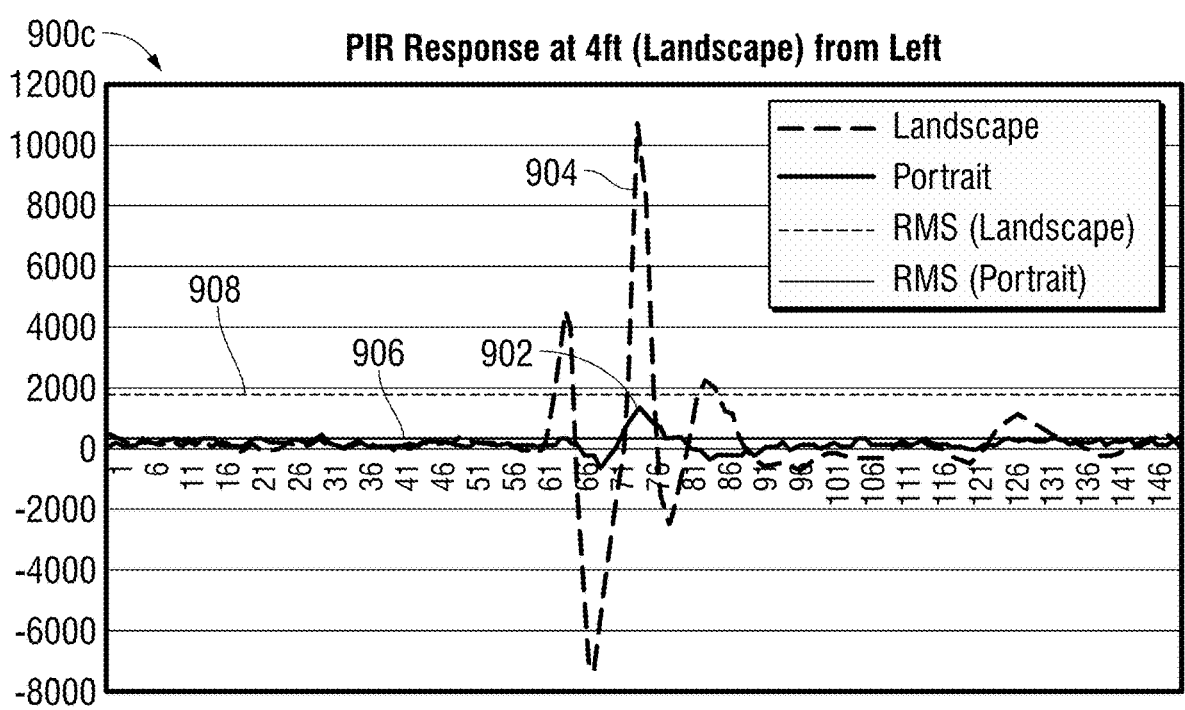
Figure 9D:
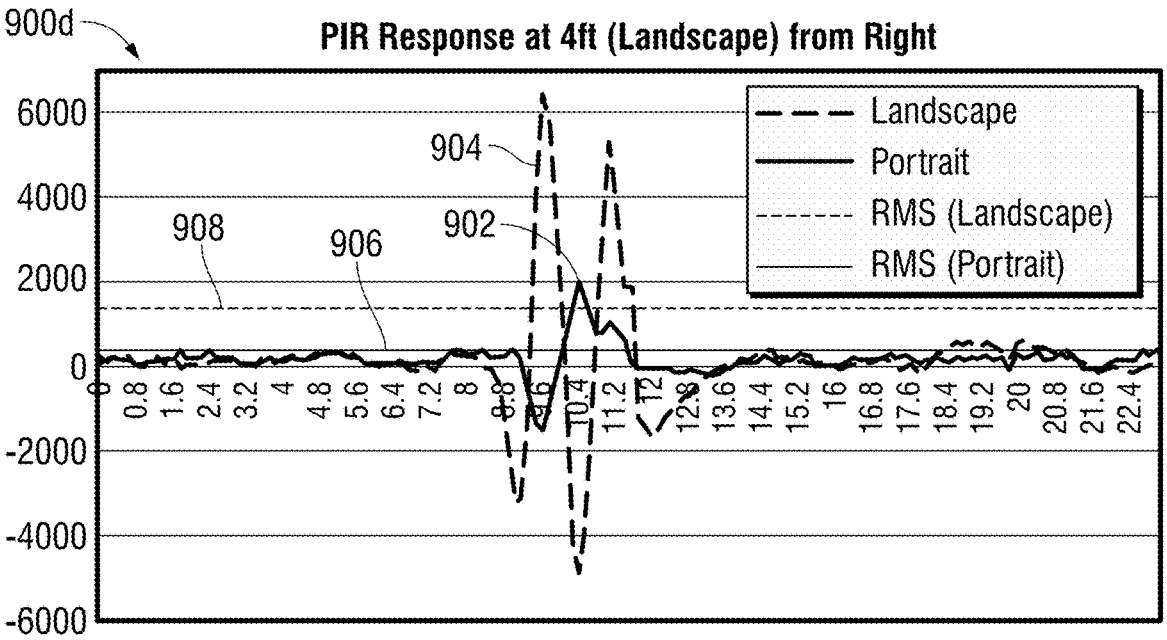

Confirmation of the orientation autodetection herein is shown in FIG. 7, which is a graph 700 of output signals generated by two PIR motion sensors of the type described herein. The vertical axis of the graph 700 represents normalized signal amplitude and the horizontal axis represents time in seconds. Data was obtained using the two PIR motion sensors arranged perpendicularly to one another in a room controller mounted in portrait orientation. The data was generated by a person walking across the field of view (FoV) of the room controller for 3 meters within a range of 34 feet from the room controller. The purpose of the exercise was to compare the RMS values of the landscape and portrait sensor output signals when a person is walking in front of the room controller far from its FoV.

In the graph 700, the orange solid line 702 represents the output of the portrait sensor and the purple solid line 704 represents the output of the landscape sensor. As can be seen, the RMS value for the portrait sensor, represented by the orange dashed line 706, is greater than the RMS value for the landscape sensor, represented by the purple dashed line 708. This result accords with the portrait orientation of the room controller and confirms that the orientation detection method herein can be used to indirectly detect the orientation of the unit.

FIGS. 8A-8D show a set of graphs 800a, 800b, 800c, and 800d that similarly affirm the orientation autodetection discussed herein. In these graphs, the vertical axes again represent normalized signal amplitude and the horizontal axes represent time in seconds. Data was again obtained using two PIR motion sensors arranged perpendicularly to one another in a room controller mounted in portrait orientation. The data was generated by a person standing in front of the room controller doing side-to-side swings with an angle of −5° and +5° (i.e., right and left swings). The purpose of this exercise was to again compare the RMS values of both sensors when a person is doing small movements near (i.e., within 2 feet and 4 feet) the room controller. This scenario simulates a user mounting the room controller on a wall, or manually setting the room controller via its user interface, and is the scenario more likely to occur in the real world compared to the scenario in FIG. 7.

In FIGS. 8A-8D, the graph 800a reflects movement from left to right within 2 feet of the room controller, the upper right graph 800b reflects movement from right to left within 2 feet from the room controller, the lower left graph 800c reflects movement from left to right within 4 feet of the room controller, and the lower right graph 800d reflects movement from right to left within 4 feet from the room controller. In each of the graphs, line 802 represents the output of the portrait sensor, line 804 represents the output of the landscape sensor, line 806 represents the RMS value for the portrait sensor, and line 808 represents the RMS value for the landscape sensor. As can be seen, the RMS value for the portrait sensor (line 806) is greater than the RMS value for the landscape sensor (line 808) in each of the graphs. This result agrees with the portrait orientation of the room controller and once again confirms that the orientation detection method herein can be used to indirectly detect the orientation of the unit.

FIGS. 9A-9D show a set of graphs 900*a*, 900*b*, 900*c*, and 900*d* similar to the set of graphs from FIGS. 8A-8D except that this time the room controller is mounted in landscape orientation. In each of these graphs, line 902 represents the output of the portrait sensor, line 904 represents the output of the landscape sensor, line 906 represents the RMS value for the portrait sensor, and line 908 represents the RMS value for the landscape sensor. As can be seen, the RMS value for the landscape sensor (line 908) is greater than the RMS value for the portrait sensor (line 906) in each of the graphs. This result corresponds to the landscape orientation of the room controller and once more confirms that the orientation detection method herein can be used to indirectly detect the orientation of the unit.

While a number of embodiments have been disclosed and described herein, it is to be understood that the above description is intended to be illustrative, and not restrictive. Many other implementation examples are apparent upon reading and understanding the above description and modifications and variations may be made within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. An electronic device, comprising:
a processor;
a display communicatively coupled to the processor;
a first sensor communicatively coupled to the processor and configured to provide first sensing data representing a first sensor output signal;
a second sensor communicatively coupled to the processor and provided in a perpendicular configuration relative to the first sensor, the second sensor configured to provide second sensing data representing a second sensor output signal;
wherein the processor is configured to determine an orientation of the electronic device based at least in part on analyzing the first sensing data and the second sensing data, and a determination whether the first sensor output signal or the second sensor output signal is stronger, and wherein the processor is further configured to control orientation of the display based on the orientation of the electronic device;
wherein the first sensor and the second sensor are motion sensors configured to detect movement external to the electronic device; and
wherein one of the first sensor and the second sensor that detects horizontal movement outputs the stronger signal.

2. The electronic device of claim 1, wherein the first sensor and the second sensor each have a predefined detection direction.

3. The electronic device of claim 2, wherein the first sensor and the second sensor are passive infrared (PIR) sensors.

4. The electronic device of claim 1, wherein the processor is configured to:

analyze the first sensor data and the second sensor data by determining a first RMS value for the first sensor data and a second RMS value for the second sensor data and comparing the first RMS value to the second RMS value; and
determine that the first sensor output signal is stronger than the second sensor output signal based at least in part on the first RMS value being greater than the second RMS value.

5. The electronic device of claim 3, further comprising a Fresnel lens disposed over the first sensor and the second sensor.

6. The electronic device of claim 1, wherein the electronic device is a room controller configured to set one or more environmental conditions in a room based on one or more user settings.

7. The electronic device of claim 1, wherein the electronic device is configured to be mounted in a horizontal orientation or a vertical orientation and the display is a touchscreen display.

8. A method of detecting device orientation in an electronic device, the method comprising:
obtaining first sensing data from a first sensor provided in the electronic device, the first sensing data representing a first sensor output signal;
obtaining second sensing data from a second sensor provided in the electronic device in a perpendicular configuration relative to the first sensor, the second sensing data representing a second sensor output signal;
determining an orientation of the electronic device based at least in part on analyzing the first sensing data and the second sensing data, and determining whether the first sensor output signal or the second sensor output signal is stronger;
controlling orientation of a display of the electronic device based on the orientation of the electronic device;
wherein the first sensor and the second sensor are motion sensors configured to detect movement external to the electronic device; and
wherein one of the first sensor and the second sensor that detects horizontal movement outputs the stronger signal.

9. The method of claim 8, wherein the first sensor and the second sensor each have a predefined detection direction.

10. The method of claim 9, wherein the first sensor and the second sensor are passive infrared (PIR) sensors.

11. The method of claim 8, wherein analyzing the first sensor data and the second sensor data comprises determining a first RMS value for the first sensor data and a second RMS value for the second sensor data and comparing the first RMS value to the second RMS value; and
determining that the first sensor output signal is stronger than the second sensor output signal based at least in part on the first RMS value being greater than the second RMS value.

12. The method of claim 10, further comprising providing a Fresnel lens over the first sensor and the second sensor.

13. The method of claim 8, wherein the electronic device is a room controller configured to set one or more environmental conditions in a room based on one or more user settings.

14. The method of claim 8, wherein the electronic device is configured to be mounted in a horizontal orientation or a vertical orientation and the display as a touchscreen display.

15. A non-transitory computer-readable media storing computer-readable instructions for detecting device orientation in an electronic device, the computer-readable instructions, when executed by one or more processors, causes the electronic device to:

obtain first sensing data from a first sensor provided in the electronic device, the first sensing data representing a first sensor output signal;

obtain second sensing data from a second sensor provided in the electronic device in a perpendicular configuration relative to the first sensor, the second sensing data representing a second sensor output signal;

determine an orientation of the electronic device based at least in part on analyzing the first sensing data and the second sensing data, and a determination whether the first sensor output signal or the second sensor output signal is stronger;

control orientation of a display of the electronic device based on the orientation of the electronic device;

wherein the first sensor and the second sensor are motion sensors configured to detect movement external to the electronic device; and wherein one of the first sensor and the second sensor that detects horizontal movement outputs the stronger signal.

16. The non-transitory computer-readable media of claim 15, wherein the first sensor and the second sensor each have a predefined detection direction.

17. The non-transitory computer-readable media of claim 16, wherein the first sensor and the second sensor are passive infrared (PIR) sensors.

18. The non-transitory computer-readable media of claim 15, wherein the computer-readable instructions cause the electronic device to analyze the first sensor data and the second sensor data by determining a first RMS value for the first sensor data and a second RMS value for the second sensor data and comparing the first RMS value to the second RMS value; and determine that the first sensor output signal is stronger than the second sensor output signal based at least in part on the first RMS value being greater than the second RMS value.

19. The non-transitory computer-readable media of claim 15, wherein the electronic device is configured to be mounted in a horizontal orientation or a vertical orientation.

20. The non-transitory computer-readable media of claim 15, wherein the electronic device is a room controller configured to set one or more environmental conditions in a room based on one or more user settings and the display is a touchscreen display.

* * * * *